(12) United States Patent
Haffner et al.

(10) Patent No.: US 8,769,748 B2
(45) Date of Patent: *Jul. 8, 2014

(54) SPRING CORE HAVING BORDER WIRE WITH GENERALLY RECTANGULAR CROSS-SECTION

(71) Applicant: L&P Property Management Company, South Gate, CA (US)

(72) Inventors: David S. Haffner, Carthage, MO (US); John E. Hull, Monett, MO (US); Steven M. Mongatue, Carthage, MO (US); Darrell A. Richmond, Carthage, MO (US); Thomas W. Wells, Joplin, MO (US)

(73) Assignee: L&P Property Management Company, South Gate, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/794,970

(22) Filed: Mar. 12, 2013

(65) Prior Publication Data

US 2013/0192002 A1   Aug. 1, 2013

Related U.S. Application Data

(63) Continuation-in-part of application No. 12/821,754, filed on Jun. 23, 2010, now Pat. No. 8,490,232.

(51) Int. Cl.
*A47C 23/04* (2006.01)
*A47C 7/34* (2006.01)
*A47C 23/053* (2006.01)
*A47C 23/00* (2006.01)
*A47C 23/043* (2006.01)
*F16F 3/04* (2006.01)

(52) U.S. Cl.
CPC . *F16F 3/04* (2013.01); *A47C 7/347* (2013.01); *A47C 23/0507* (2013.01); *A47C 23/007* (2013.01); *A47C 23/043* (2013.01)
USPC .................................................. 5/717; 5/716

(58) Field of Classification Search
CPC .... A47C 27/05; A47C 27/04; A47C 27/0453; A47C 27/066; A47C 27/068; A47C 27/07
USPC .................................................. 5/716, 717
See application file for complete search history.

(56) References Cited

U.S. PATENT DOCUMENTS

| | | |
|---|---|---|
| 2,105,923 A | 1/1938 | Marsack |
| 2,235,538 A | 3/1941 | Schob |
| 2,244,543 A | 6/1941 | Seavert |
| 2,319,431 A | 5/1943 | Owen |
| 2,336,975 A | 12/1943 | Asaro |
| 2,885,693 A | 5/1959 | Wuest |
| 2,978,714 A | 4/1961 | Bechik |

(Continued)

*Primary Examiner* — Robert G Santos
*Assistant Examiner* — David E Sosnowski
(74) *Attorney, Agent, or Firm* — Wood, Herron & Evans, LLP

(57) ABSTRACT

A bedding or seating product comprising a spring core including upper and lower border wires. Each of the border wires is generally rectangular in cross-section to reduce wire costs without compromising beam strength of the border wire. Each row of springs of the spring core may be made of a single piece of wire. The rows of springs may be arranged in side-by-side rows and columns and be connected with each other by helical lacing wires.

20 Claims, 7 Drawing Sheets

(56) References Cited

U.S. PATENT DOCUMENTS

| | | | |
|---|---|---|---|
| 3,173,159 | A | 3/1965 | Hart |
| RE25,951 | E | 12/1965 | Nachman, Jr. |
| 3,737,929 | A | 6/1973 | Golembeck |
| 3,756,167 | A | 9/1973 | Wilson |
| 3,914,809 | A | 10/1975 | Ciampa et al. |
| 4,112,726 | A | 9/1978 | Adams et al. |
| 4,245,362 | A | 1/1981 | Mueller |
| 4,245,363 | A | 1/1981 | Callaway |
| 4,348,014 | A | 9/1982 | Litkewycz |
| 4,389,743 | A * | 6/1983 | Callaway .......... 5/720 |
| 4,423,308 | A * | 12/1983 | Callaway et al. ......... 219/217 |
| 4,424,600 | A | 1/1984 | Callaway |
| 4,435,864 | A | 3/1984 | Callaway |
| 4,449,261 | A | 5/1984 | Magnusson |
| 4,470,584 | A | 9/1984 | Mizelle |
| 4,492,298 | A | 1/1985 | Zapletal et al. |
| 4,704,752 | A * | 11/1987 | Yates et al. .......... 5/247 |
| 4,771,494 | A * | 9/1988 | Zapletal et al. .......... 5/716 |
| 4,790,038 | A | 12/1988 | Ikeda |
| 4,886,249 | A | 12/1989 | Docker et al. |
| 4,942,636 | A | 7/1990 | Scott et al. |
| 4,972,536 | A | 11/1990 | Scott |
| 5,052,064 | A | 10/1991 | Hagemeister et al. |
| 5,062,172 | A | 11/1991 | Stewart |
| 5,361,434 | A | 11/1994 | Hagemeister et al. |
| 5,418,989 | A | 5/1995 | Roe |
| 5,471,688 | A | 12/1995 | Cavazos |
| 5,485,639 | A | 1/1996 | Cavazos |
| 5,636,396 | A | 6/1997 | Workman et al. |
| 5,652,986 | A | 8/1997 | Wells |
| 5,787,532 | A | 8/1998 | Langer et al. |
| 5,803,440 | A | 9/1998 | Wells |
| 5,860,200 | A | 1/1999 | Wells et al. |
| 6,149,143 | A | 11/2000 | Richmond et al. |
| 6,158,071 | A | 12/2000 | Wells |
| 6,202,238 | B1 | 3/2001 | Mossbeck et al. |
| 6,829,798 | B2 | 12/2004 | Wells |
| 7,237,282 | B2 | 7/2007 | Beck et al. |
| 7,251,847 | B2 | 8/2007 | Wells |
| 7,386,897 | B2 | 6/2008 | Eigenmann et al. |
| 7,513,003 | B2 * | 4/2009 | Mossbeck .......... 5/731 |
| 7,805,780 | B2 | 10/2010 | Davis et al. |
| 7,870,626 | B2 | 1/2011 | Antinori |
| 7,921,561 | B2 | 4/2011 | Eigenmann et al. |
| 8,327,475 | B2 | 12/2012 | Haffner et al. |
| 8,332,974 | B2 | 12/2012 | Haffner et al. |
| 8,429,772 | B2 | 4/2013 | Eigenmann et al. |
| 8,429,779 | B2 | 4/2013 | Eigenmann et al. |
| 8,490,232 | B2 * | 7/2013 | Haffner et al. .......... 5/717 |
| 2007/0094807 | A1 | 5/2007 | Wells |
| 2008/0115287 | A1* | 5/2008 | Eigenmann et al. .......... 5/716 |
| 2010/0295223 | A1* | 11/2010 | Eigenmann et al. .......... 267/166 |
| 2010/0299839 | A1* | 12/2010 | Eigenmann et al. .......... 5/655.7 |
| 2011/0314601 | A1* | 12/2011 | Haffner et al. .......... 5/247 |
| 2011/0314613 | A1 | 12/2011 | Haffner et al. |
| 2012/0110732 | A1* | 5/2012 | Haffner et al. .......... 5/247 |
| 2012/0204426 | A1* | 8/2012 | Eigenmann et al. ....... 29/896.92 |

\* cited by examiner

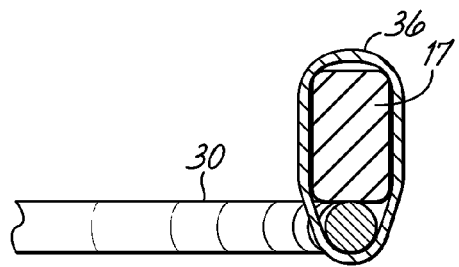 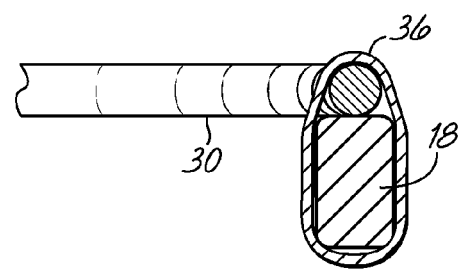
FIG. 3  FIG. 4
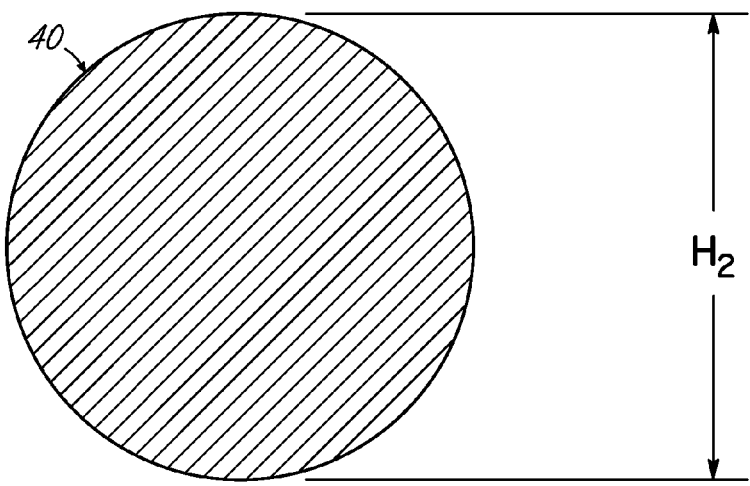
FIG. 5
PRIOR ART
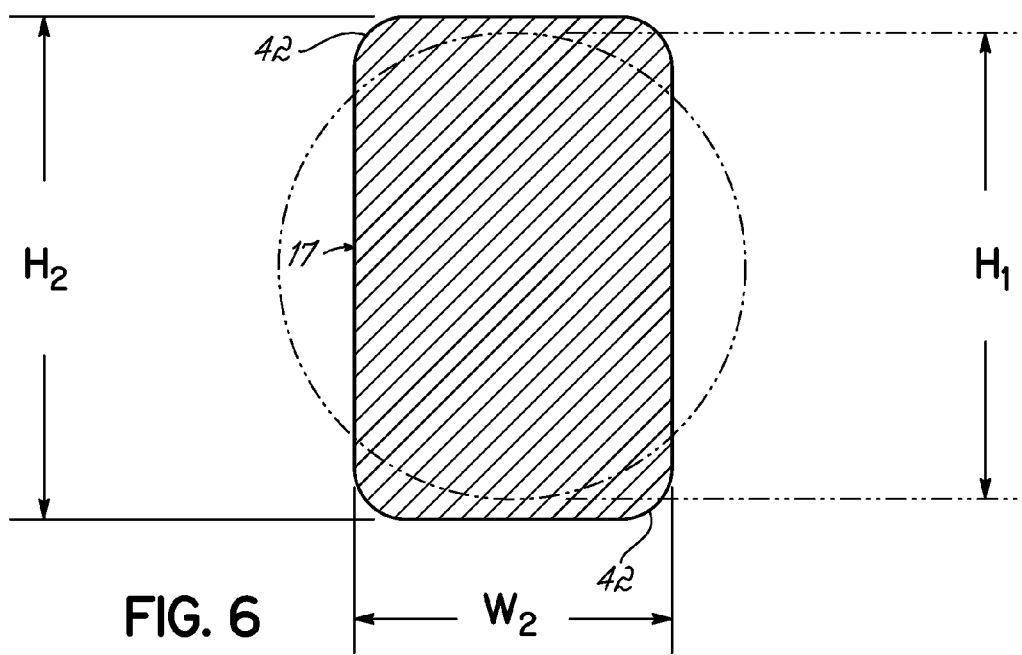
FIG. 6

SPRING CORE HAVING BORDER WIRE WITH GENERALLY RECTANGULAR CROSS-SECTION

This application is a continuation-in-part of U.S. patent application Ser. No. 12/821,754 filed Jun. 23, 2010 entitled "Spring Core Having Border Wire With Generally Rectangular Cross-Section", which is fully incorporated by reference herein.

BACKGROUND OF THE INVENTION

This invention relates generally to bedding or seating products and, more particularly, to a spring core for a mattress.

Traditionally, spring cores for mattresses have consisted of a plurality of spaced parallel rows of helical coil springs mounted between border wires; coil springs adjacent the border wires being attached thereto via helical lacing wires, sheet metal clips or other connectors. The upper and lower end turns of adjacent coil springs are generally connected to each other by helical lacing wires. Coil springs are arranged in longitudinally extending columns and transversely extending rows. Padding and upholstery commonly are secured to opposed surfaces of the spring core, thereby resulting in what is known in the industry as a two-sided mattress for use on either side.

Recently, spring cores have been developed having only one border wire to which the end turns of the outermost coil springs are secured. After padding and/or other materials are placed over the upper surface of the spring core in which the border wire is located, an upholstered covering is sewn or secured around the spring core and cushioning materials, thereby creating what is known in the industry as a one-sided or single-sided mattress.

The upper and lower end turns of unknotted coil springs often are made with portions or legs which abut one another when coil springs are placed next to each other. Adjacent coil springs are connected to each other at their end turns with helical lacing wire. One leg of an end turn of a coil spring is set beside the opposite leg of an end turn of the adjacent coil spring. The side-by-side legs are laced together with helical lacing wire.

The greatest expense in manufacturing spring cores or assemblies is the cost of the raw material, the cost of the steel used to make the coil springs which are assembled together. For many years, the wire from which unknotted coil springs have been manufactured has a tensile strength no greater than 290,000 psi. This standard wire, otherwise known as AC&K (Automatic Coiling and Knotting) grade wire has a tensile strength on the order of 220,000 to 260,000 and is thicker, i.e., has a greater diameter, than high tensile strength wire, i.e., wire having a tensile strength greater than 265,000 psi. In order to achieve the same resiliency or bounce back, a coil spring made of standard gauge wire must have one half an additional turn when compared to a coil spring made of high tensile wire. In other words, the pitch of the coil springs made of high tensile wire may be greater as compared to coil springs made of standard wire. Coil springs made of high tensile strength wire also do not tend to set or permanently deform when placed under significant load for an extended period of time, i.e., during shipping. Therefore, there is a desire in the industry to make coil springs having unknotted end turns of high tensile strength wire because less wire is necessary to manufacture each coil spring.

U.S. Pat. No. 7,386,897 discloses a bedding or seating product having a spring core made of high tensile strength wire. However, each of the spring cores disclosed in this patent has at least one border wire having a round cross-sectional configuration.

The border wire of these and other known spring cores are often six-gauge, having a diameter of 0.191 inches. To make a border wire having the same beam strength, but made from a smaller diameter wire, say seven-gauge wire having a diameter of 0.176 inches, would save material and therefore reduce the end cost of the innerspring or spring core. In order to achieve the same beam strength, the seven-gauge border wire must be changed or shaped from a circular cross-section to a rectangular cross-section in accordance with the present invention. Thus, the present invention enables one to use a seven-gauge wire rather than a six-gauge wire in the border wire of the spring core and therefore, reduce wire cost without giving up any beam strength.

In order to achieve cost savings, it would be desirable to reduce the cross sectional area of the border wire of a spring core (by creating the border wire from a smaller diameter wire) while maintaining the same beam strength or increasing it. Therefore, making a spring core having at least one border wire with a rectangular cross-section would result in cost savings for the manufacturer of the spring core.

SUMMARY OF THE INVENTION

This invention provides the desirable cost savings in wire without compromising the integrity of the spring cores of bedding or seating products. In one embodiment, the bedding or seating product comprises a spring core or spring assembly comprising upper and lower border wires and a plurality of rows of springs joined together with helical lacing wires. Padding overlies the spring assembly, and a fabric covering encases the padding and spring assembly.

The spring assembly includes upper and lower generally rectangular border wires having two parallel sides and two parallel ends. Each of the border wires has a generally rectangular cross-sectional configuration with the height being greater than the width of the cross-section.

Each border wire of each of the spring assemblies of this invention has a unique cross-sectional configuration which enables the border wire to be made of a larger gauge, smaller diameter wire than heretofore known in the art without compromising the beam strength of the border wire when compared to prior art border wires having a round cross-sectional configuration. The smaller diameter wire, when reshaped from a circular cross-section into a rectangular cross-section, has the same cross-sectional area as when it had a circular cross-section. One advantage of this invention is that it enables a bedding or seating spring core or spring assembly having at least one border wire to be made using less steel or material, thereby reducing the ultimate cost of the product to the product's assembler.

In addition to reducing the quantity of wire necessary to manufacture a spring core for use in a bedding or seating product, the unique shape of the border wire of the present invention provides a secure connection between the end turns of the springs and the border wire.

Although several types of spring cores have been described, the present border wire may be used in any bedding or seating product. For example, individually pocketed coil springs may be used rather than convention coil springs, the pocketed coil springs being clipped to the unique border wire or wires of this invention.

BRIEF DESCRIPTION OF THE DRAWINGS

The objectives and features of the invention will become more readily apparent from the following detailed description taken in conjunction with the accompanying drawings in which:

FIG. 3 is a cross-sectional view taken along the line 3-3 of FIG. 2;

FIG. 4 is a cross-sectional view taken along the line 4-4 of FIG. 2;

FIG. 5 is a cross sectional view illustrating prior art;

FIG. 6 is a cross sectional view illustrating the border wire of the present invention;

DETAILED DESCRIPTION OF THE INVENTION

Figure 1:
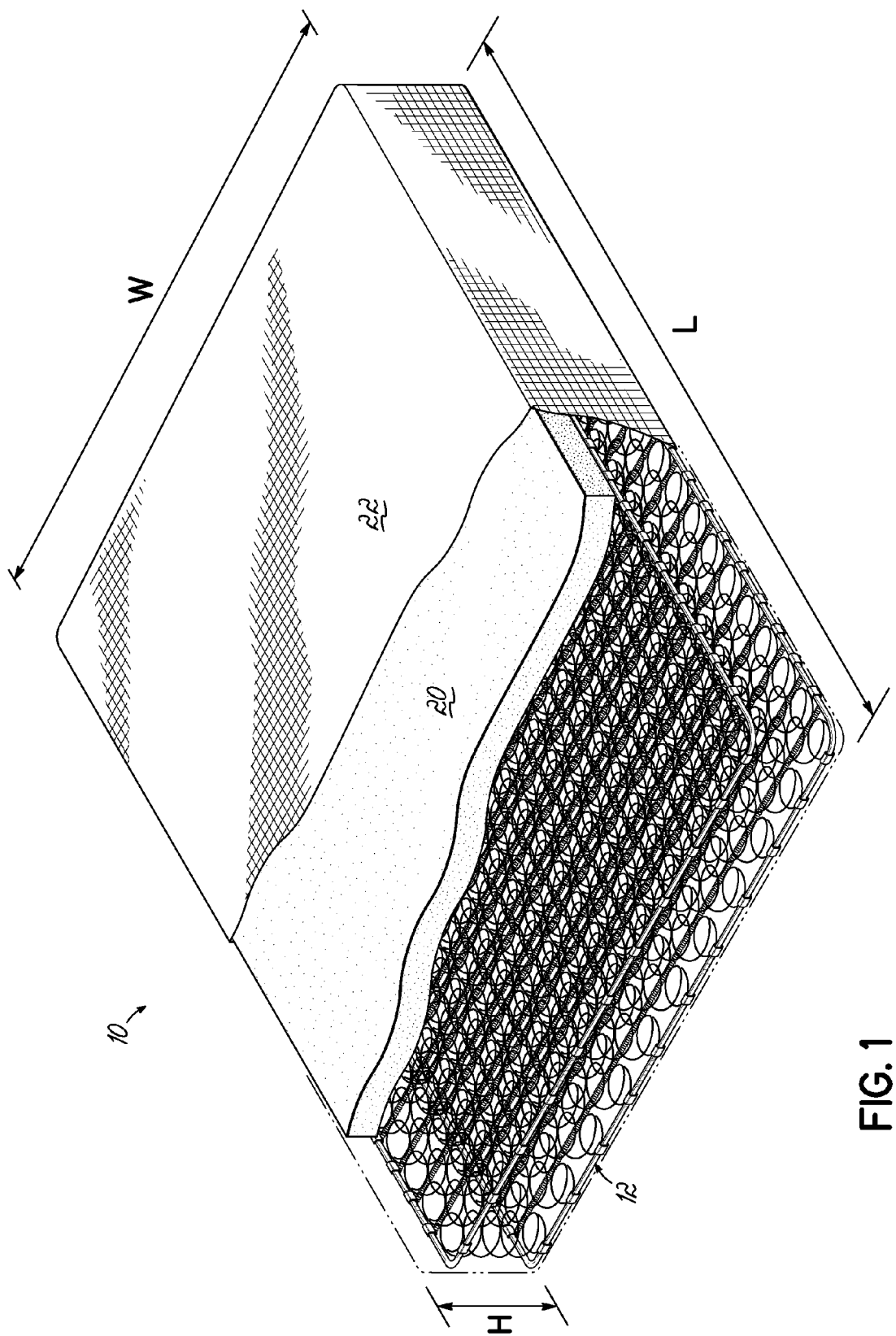
FIG. 1 is a perspective view, partially broken away, of a mattress according to one embodiment.

Referring to the drawings and, particularly to FIG. 1, a bedding or seating product in the form of a mattress 10, according to one embodiment of this invention, is illustrated. As shown in FIG. 1, the mattress 10 has a longitudinal dimension or length L, a transverse dimension or width W and a height H. Although the length L is shown as being greater than the width W, they may be identical.

The mattress 10 comprises a spring core or spring assembly 12 comprising a plurality of aligned coil springs 14 held together with helical lacing wires 16 and upper and lower border wires 17, 18. Padding 20 overlies the spring assembly 12, and a fabric covering 22 surrounds the padding 20 and spring assembly 12.

Figure 2:
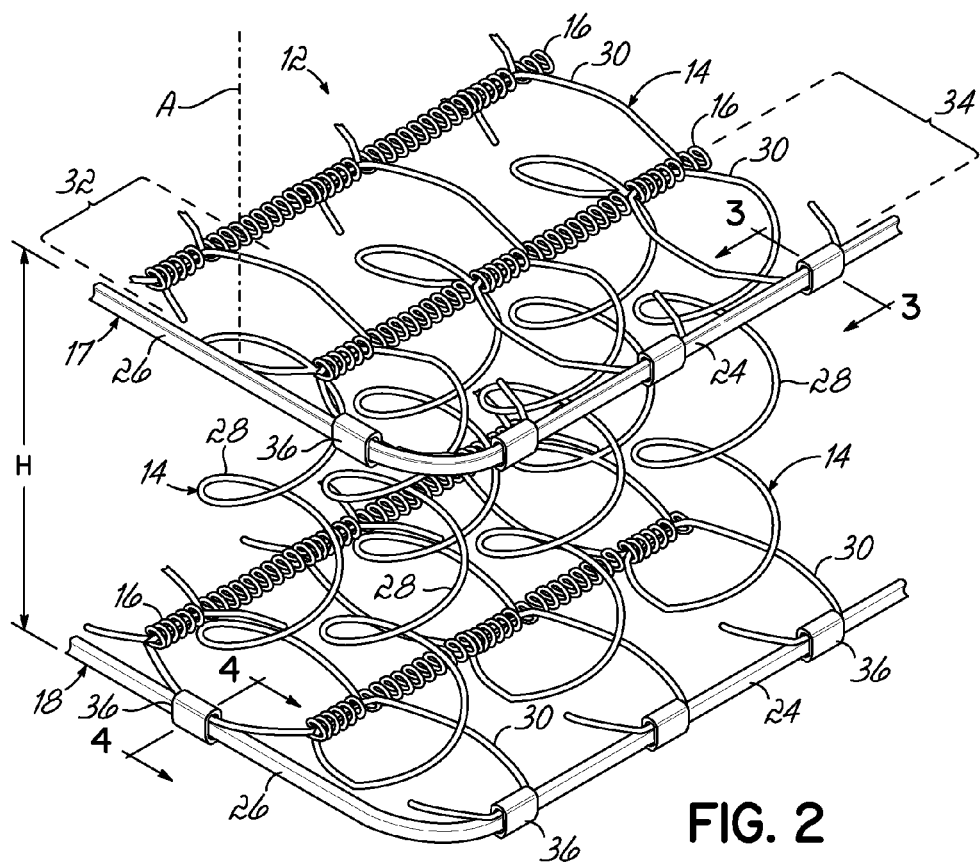
FIG. 2 is an enlarged perspective view illustrating a portion of the mattress of FIG. 1.

FIG. 2 illustrates a two-sided spring assembly 12 having upper and lower generally rectangular steel border wires 17, 18. Each border wire has two parallel sides 24, 24 and two parallel ends 26, 26. The parallel sides 24, 24 are longer than the parallel ends 26, 26 in the embodiment illustrated. However, they may be the same size.

Each of the coil springs 14 is made of one piece of wire having a central spiral portion 28 defining a central spring axis A and terminating at opposed ends with upper and lower unknotted end turns 30. The coil springs 14 are arranged in side-by-side rows 32 and columns 34. The coil springs 14 are connected with each other by helical lacing wires 16. More particularly, the end turns 30 of the coil springs 14 are joined together using the helical lacing wires 16, as is known in the art. Although the helical lacing wires 16 are shown as extending parallel the sides 24 of the border wires 17, 18, they may extend parallel the ends 26 of the border wires. In other words, different orientations of the coil springs and helical lacing wires within the spring core are possible within the scope of the present invention.

As shown in FIG. 2, the upper end turns 30 of the outermost coil springs 14 of the spring core 12 are clipped to the upper border wire 17 by clips 36. As shown in FIG. 3, the upper end turns 30 of the outermost coil springs 14 are positioned below the upper border wire 17. The upper border wire 17 is clipped to the upper end turns 30 of the outermost coil springs by clips 36. One of the clips 36 surrounds one of the upper end turns 30 of one of the outermost coil springs 14 and the upper border wire 17 at a predetermined, desired position, as shown in FIG. 3. As shown in FIG. 4, the lower end turns 30 of the outermost coil springs 14 are positioned above the lower border wire 18. One of the clips 36 surrounds one of the lower end turns 30 of one of the outermost coil springs 14 and the lower border wire 18 at a predetermined, desired position.

The spring assembly 12 of mattress 10 is generally manufactured by a supplier, who then ships it to an assembler. The assembler adds to the spring assembly 12 padding 20, and covers the components with upholstery 22 to make a completed product.

One advantage of the spring assembly 12 and associated bedding or seating product, such as mattress 10 according to this invention, is that each of the border wires 17, 18 is uniquely configured to enable the border wire to be made of a lesser gauge, smaller diameter wire than existing border wires without giving up any strength. In the embodiments of mattress 10 and associated spring assembly 12 shown in FIGS. 1-4 and 6 of the drawings, each of the border wires 17, 18 has a rectangular cross-sectional configuration. The upper border wire 17 is shown and described in FIG. 6, although each of the border wires of each of the embodiments illustrated or described herein may be identical to upper border wire 17. As shown in FIG. 6, the height $H_2$ of border wire 17 is greater than the width $W_2$ of the border wire 17.

FIG. 5 illustrates a cross-section of a prior art border wire 40 made of six-gauge wire. The cross-section is round and has a diameter of $H_2$ (0.191 inches in the case of six-gauge wire).

FIG. 6 illustrates a rectangular cross-section of the upper border wire 17 of mattress 10. Lower border wire 18 of mattress 10 is identical to upper border wire 17. The upper border wire 17 is reshaped into a rectangular cross section from a seven-gauge wire having a round cross section (shown in dashed lines in FIG. 6) having a diameter of $H_1$, which is less than the diameter $H_2$ of the six-gauge wire shown in FIG. 5. In the example, $H_1$ is 0.176 inches and $H_2$ is 0.191 inches. The cross-section of border wire 17 shown in FIG. 6 is rectangular and has a height of $H_2$ (0.191 inches, same as the diameter of the six-gauge wire shown in FIG. 5) and a width of 0.120 inches. Thus, in switching from a six-gauge wire having a round cross-section to a seven-gauge wire having a rectangular cross-section, no height is lost. In changing the shape of the border wire 17 from a round cross-section to a rectangular cross-section, the cross-sectional area remains approximately identical. The generally rectangular cross-section of border wire has rounded corners 42 as shown in FIG. 6.

Figure 2A:
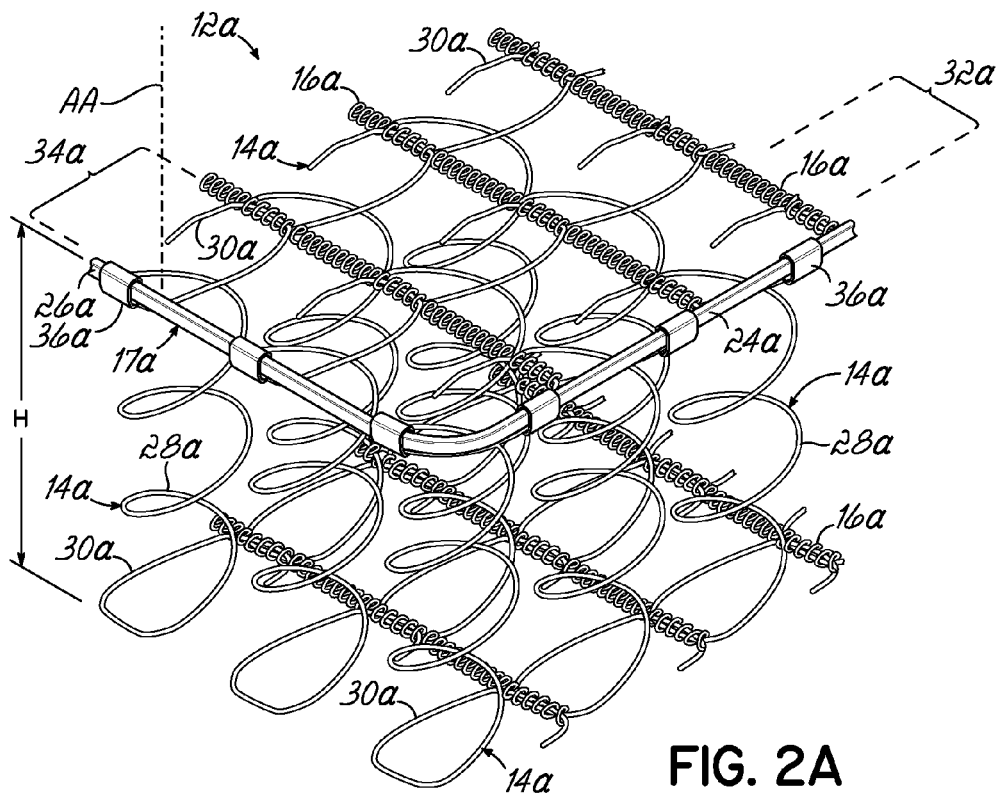
FIG. 2A is an enlarged perspective view of a portion of an alternative embodiment of spring core in accordance with the present invention.

FIG. 2A illustrates a one-sided spring assembly 12a having only an upper border wire 17a and no lower border wire. Border wire 17a is configured and sized like the border wires 17, 18. Each of the coil springs 14a of spring core 12a is made of one piece of wire having a central spiral portion 28a defining a central spring axis AA and terminating at opposed ends with upper and lower unknotted end turns 30a. The coil springs 14a are arranged in side-by-side rows 32a and columns 34a. The coil springs 14a are connected with each other by helical lacing wires 16a. More particularly, the end turns 30a of the coil springs 14a are joined together using the helical lacing wires 16a, as is known in the art. Although the helical lacing wires 16a are shown as extending parallel the ends 26a of the border wire 17a, they may extend parallel the sides 24 of the border wire. In other words, different orientations of the coil springs and helical lacing wires within the spring core 12a are possible within the scope of the present invention. As shown in FIG. 2A, the upper end turns 30a of the outermost coil springs 14a of the spring core 12a are clipped to the upper border wire 17a by clips 36a.

Figure 2B:
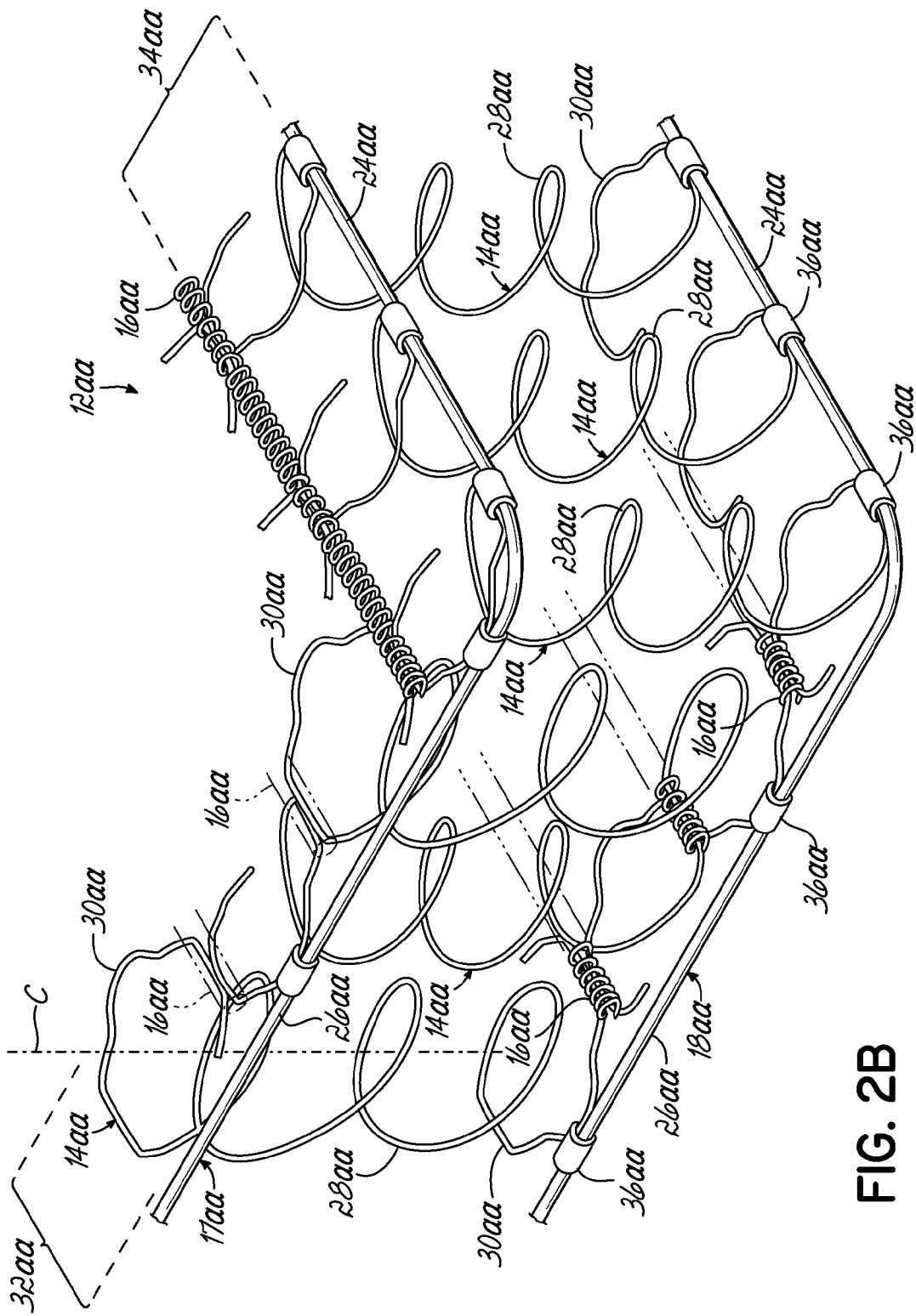
FIG. 2B is an enlarged perspective view of a portion of an alternative embodiment of spring core in accordance with the present invention.

FIG. 2B illustrates a two-sided spring assembly 12aa having an upper border wire 17aa and a lower border wire 18aa. Border wires 17aa and 18aa are configured and sized like the border wires 17, 18. Each border wire 17aa, 18aa has two parallel, longitudinally extending sides 24aa, 24aa and two parallel, transversely extending ends 26aa, 26aa. The parallel sides 24aa, 24aa are longer than the parallel ends 26aa, 26aa in the embodiment illustrated. However, they may be the same size. Each of the coil springs 14aa of spring core 12aa is made of one piece of wire having a central spiral portion 28aa defining a central spring axis C and terminating at opposed ends with upper and lower unknotted end turns 30aa. This type of coil spring is disclosed in U.S. Pat. No. 7,921,561, which is fully incorporated herein. The coil springs 14aa are arranged in transversely extending side-by-side rows 32aa and longitudinally extending columns 34aa. The coil springs 14aa are connected with each other by helical lacing wires 16aa extending longitudinally. More particularly, the end turns 30aa of the coil springs 14aa are joined together using the helical lacing wires 16aa, as is known in the art. Although the helical lacing wires 16aa are shown as extending parallel the sides 24aa of the border wire 17aa, they may extend parallel the ends 26aa of the border wires 17aa, 18aa if the springs were oriented differently relative to the border wires. In other words, different orientations of the coil springs and helical lacing wires within the spring core 12aa are possible within the scope of the present invention. As shown in FIG. 2B, the upper and lower end turns 30aa of the outermost coil springs 14aa of each transversely extending row 32aa of coil springs 14aa (only one end being shown in FIG. 2B) are clipped to the upper and lower border wires 17aa, 18aa, respectively, by clips 36aa. However, at the ends of each column 34aa of coil springs 14aa (only one end being shown in FIG. 2B), only one of the end turns 30aa of the outermost coil spring 14aa is clipped to one of the upper and lower border wires 17aa, 18aa by a clip 36aa. This orientation of coil springs with a spring core is disclosed in U.S. Pat. No. 7,921,561.

Figure 7:
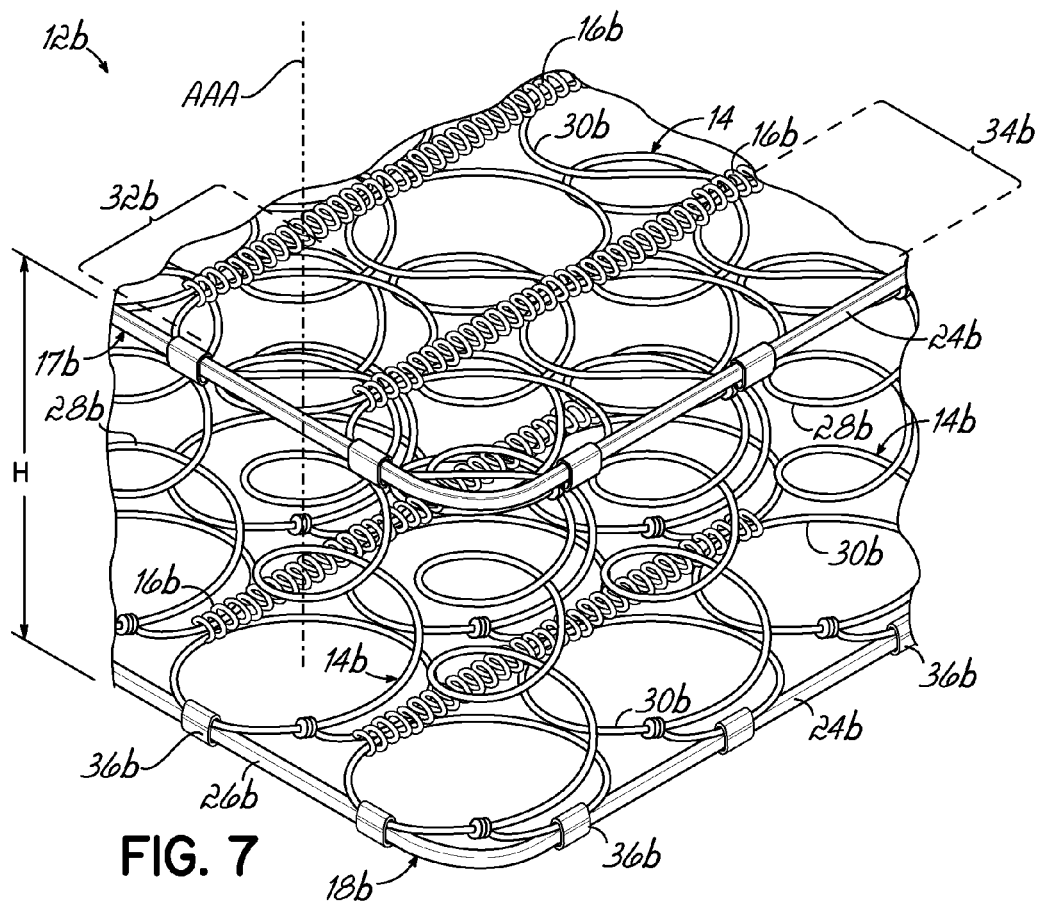
FIG. 7 is an enlarged perspective view of a portion of an alternative embodiment of spring core in accordance with the present invention.

FIG. 7 illustrates another embodiment of a two-sided spring assembly 12b having an upper border wire 17b and a lower border wire 18b, each configured and sized like the border wires 17, 18. Each of the coil springs 14b of spring core 12b is made of one piece of wire having a central spiral portion 28b defining a central spring axis AAA and terminating at opposed ends with upper and lower knotted end turns 30b. The coil springs 14b are arranged in side-by-side rows 32b and columns 34b. The coil springs 14b are connected with each other by helical lacing wires 16b. More particularly, the end turns 30b of the coil springs 14b are joined together using the helical lacing wires 16b, as is known in the art. Although the helical lacing wires 16b are shown as extending parallel the ends 24b of the border wires 17b, 18b, they may extend parallel the ends 26b of the border wires. In other words, different orientations of the coil springs and helical lacing wires within the spring core are possible within the scope of the present invention. As shown in FIG. 7, the upper and lower end turns 30b of the outermost coil springs 14b of the spring core 12b are clipped to the border wires 17b, 18b by clips 32b as described herein.

Figure 8:
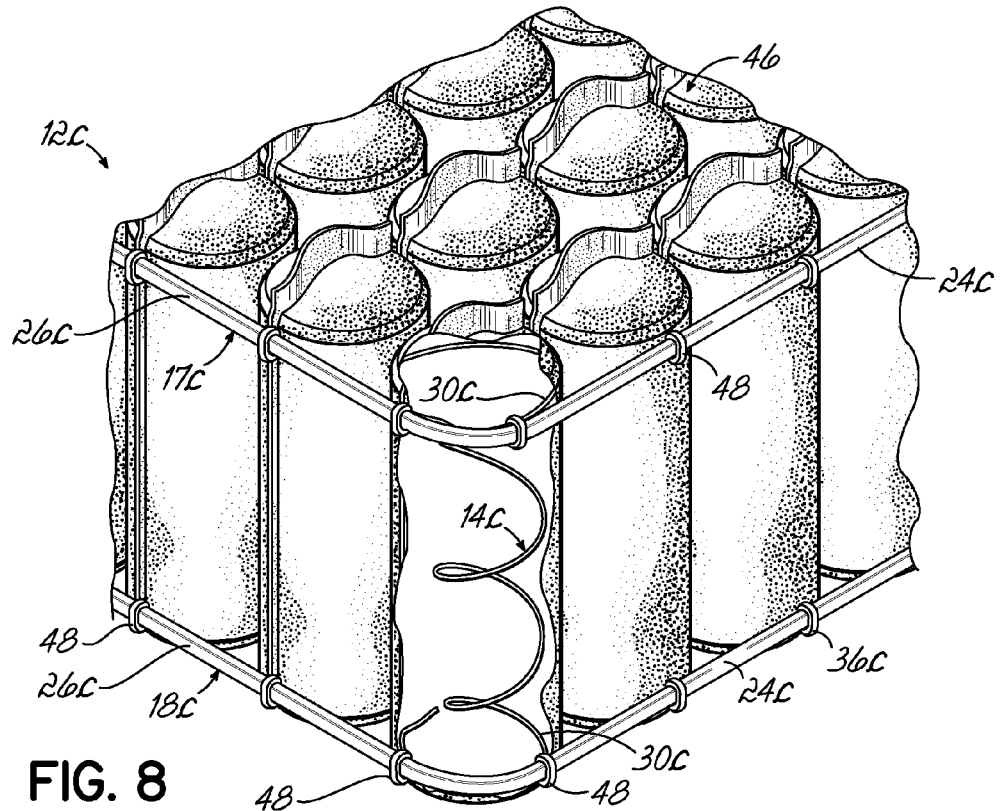
FIG. 8 is an enlarged perspective view of a portion of an alternative embodiment of spring core in accordance with the present invention.

FIG. 8 illustrates another embodiment of a two-sided spring assembly 12c having an upper border wire 17c and a lower border wire 18c, each configured and sized like the border wires 17, 18. The spring assembly 12c is a pocketed spring assembly comprising a plurality of parallel strings of springs 46 joined to each other. Each of the strings of springs 46 of spring core 12c comprises a row of individually pocketed springs, as is known in the art. Although the strings of springs 46 are shown as extending parallel the ends 24c of the border wires 17c, 18c, they may extend parallel the ends 26c of the border wires. In other words, different orientations of the strings of springs within the pocketed spring core are possible within the scope of the present invention. Also, any type of spring may be inside the individual pockets. As shown in FIG. 8, the upper and lower end turns 30c of the pocketed springs 14c of the spring core 12c are clipped to the border wires 17c, 18c by hog rings 48, as is known in the pocketed spring art.

Figure 9:
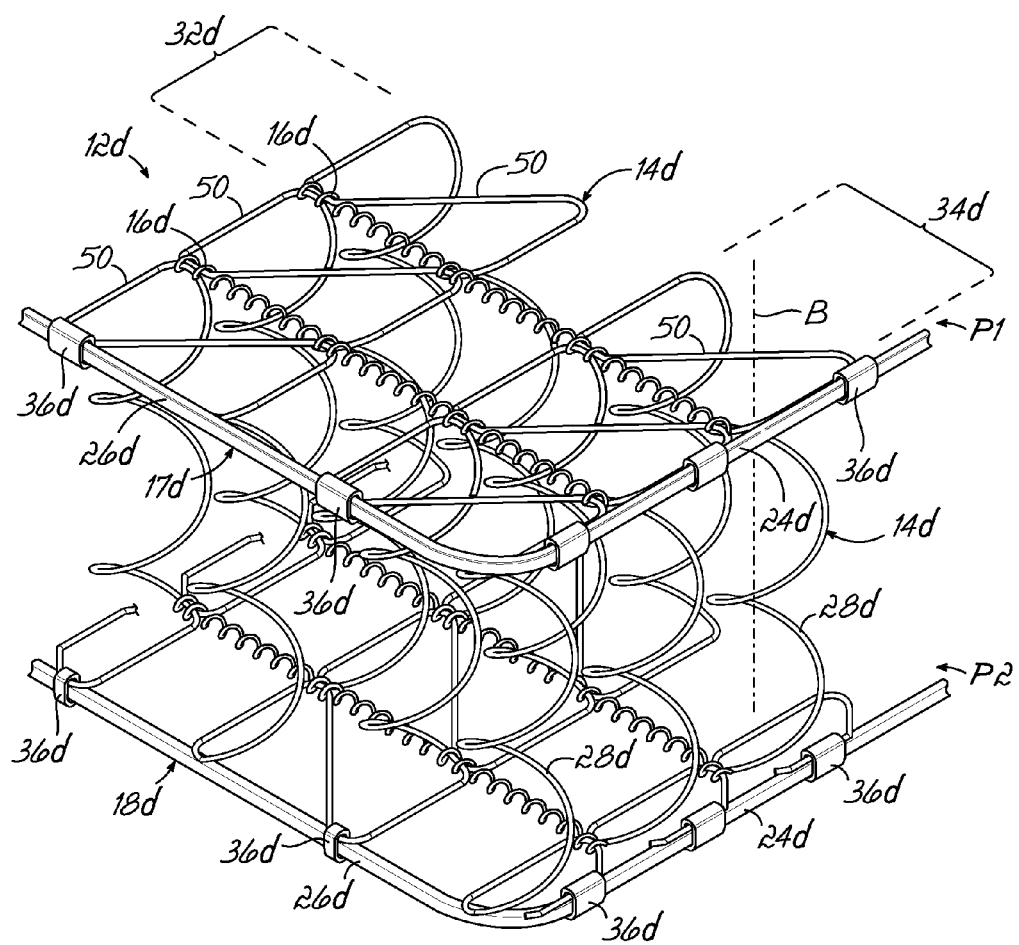
FIG. 9 is an enlarged perspective view of a portion of an alternative embodiment of spring core in accordance with the present invention.

FIG. 9 illustrates another embodiment of a two-sided spring assembly or core 12d having an upper border wire 17d and a lower border wire 18d, each configured and sized like the border wires 17, 18. In this embodiment, the spring core 12d comprises a plurality of aligned rows 32d of continuous springs 14d, each of the rows 32d of continuous springs 14d being made of one piece of wire. Each of the springs 14d of spring core 12d has a central spiral portion 28d defining a central spring axis B. Each of the springs 14d of spring core 12d is joined to adjacent springs 14d with Z-shaped connectors 50 located generally in the upper and lower planes P1 and P2 of spring core 12d. The upper and lower border wires 17d, 18d are also located generally in the upper and lower planes P1 and P2 of spring core 12d. These types of continuous springs are known in the art as MIRA-COIL® springs and are disclosed in U.S. Pat. Nos. 4,112,726 and 4,492,298, which are both fully incorporated herein. The continuous rows of springs 14d are arranged in transversely extending side-by-side rows 32d (from side-to-side) and longitudinally extending columns 34d (from head-to-foot of spring core 12d). Adjacent rows 32d of springs 14b are connected with each other by helical lacing wires 16d extending parallel the ends 26d of the border wires 17d, 18d. Although FIG. 9 illustrates the rows 32d of continuous springs 14d extending across the transverse dimension of the spring core 12d from side-to-side, the rows 32d of continuous springs 14b may extend longitudinally from end-to-end. In such an orientation, the helical lacing wires 16d would extend parallel the sides 24d of the border wires 17d, 18d rather than as are shown extending parallel the ends 26d of the border wires 17d, 18d. In other words, different orientations of the rows of springs and helical lacing wires within the spring core are possible within the scope of the present invention. As shown in FIG. 9, portions of the outermost Z-shaped connectors 50 of the spring core 12d may be clipped to the border wires 17d, 18d by clips 36d (only one side being shown).

Figure 10A:
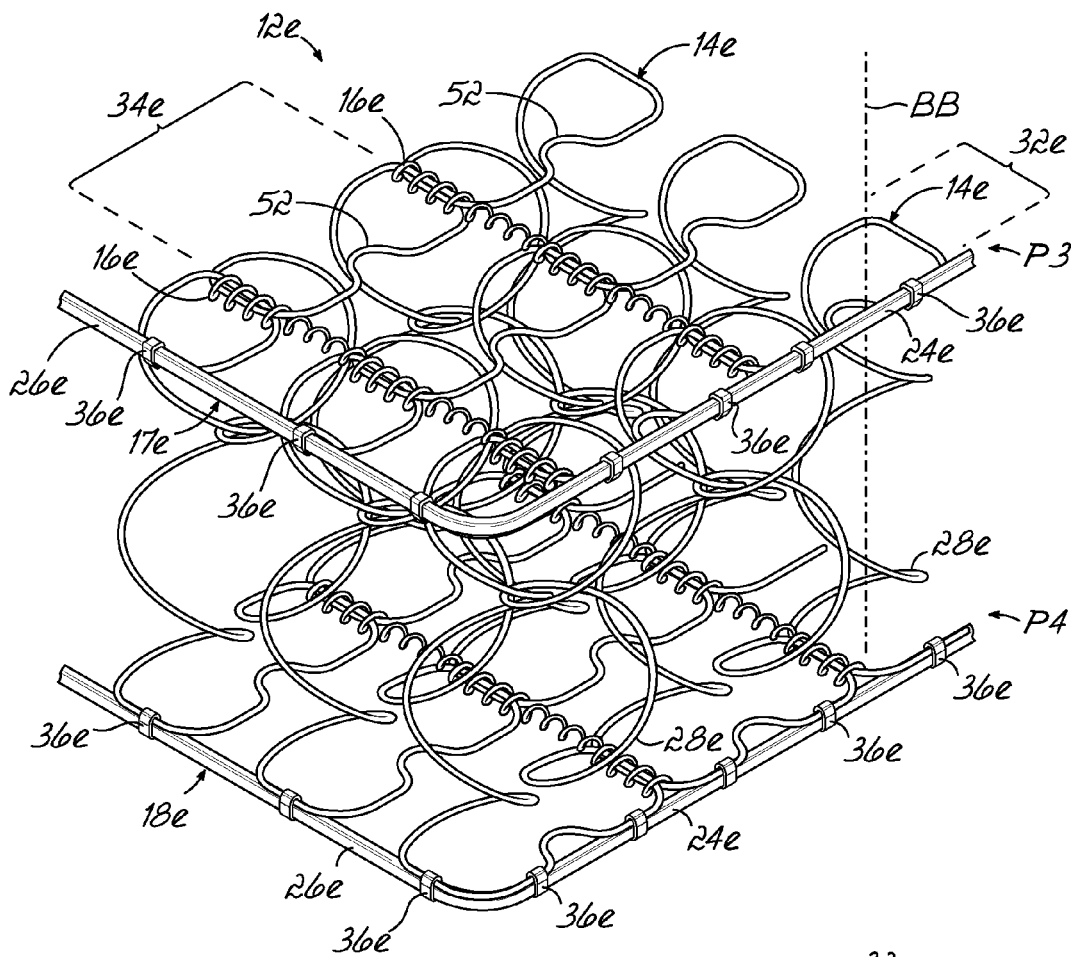
FIG. 10A is an enlarged perspective view of a portion of an alternative embodiment of spring core in accordance with the present invention.

FIG. 10A illustrates another embodiment of a two-sided spring assembly or core 12e having an upper border wire 17e and a lower border wire 18e, each configured and sized like the border wires 17, 18. In this embodiment, the spring core 12e comprises a plurality of aligned rows 32e of continuous springs 14e, each of the rows 32e of continuous springs 14e being made of one piece of wire. Each of the coil springs 14e of spring core 12e has a central spiral portion 28e defining a central spring axis BB. Each of the springs 14e of spring core 12e is joined to adjacent springs 14e with E-shaped connectors 52 located generally in the upper and lower planes P3 and P4 of spring core 12e. The upper and lower border wires 17e, 18e are also located generally in the upper and lower planes P3 and P4 of spring core 12e. These types of continuous springs are known in the art as SUPERLASTIC® springs and are disclosed in U.S. Pat. Nos. 4,972,536 and 4,942,636, which are both fully incorporated herein. The continuous rows of springs 14e are arranged in side-by-side rows 32e and columns 34e. Adjacent rows 32e of springs 14e are connected with each other by helical lacing wires 16e extending parallel the ends 26e of the border wires 17e, 18e. Although FIG. 10A illustrates the rows 32e of continuous springs 14e extending longitudinally of the spring core 12e from end-to-end, the rows 32e of continuous springs 14e may extend across the transverse dimension from side-to-side. In such an orientation, the helical lacing wires 16e would extend parallel the sides 24e of the border wires 17e, 18e rather than as are shown extending parallel the ends 26e of the border wires 17e, 18e. In other words, different orientations of the rows of springs and helical lacing wires within the spring core are possible within the scope of the present invention. As shown in FIG. 10A, portions of the outermost E-shaped connectors 52 of the spring core 12e may be clipped to the border wires 17e, 18e by clips 36e (only one side being shown).

Figure 10B:
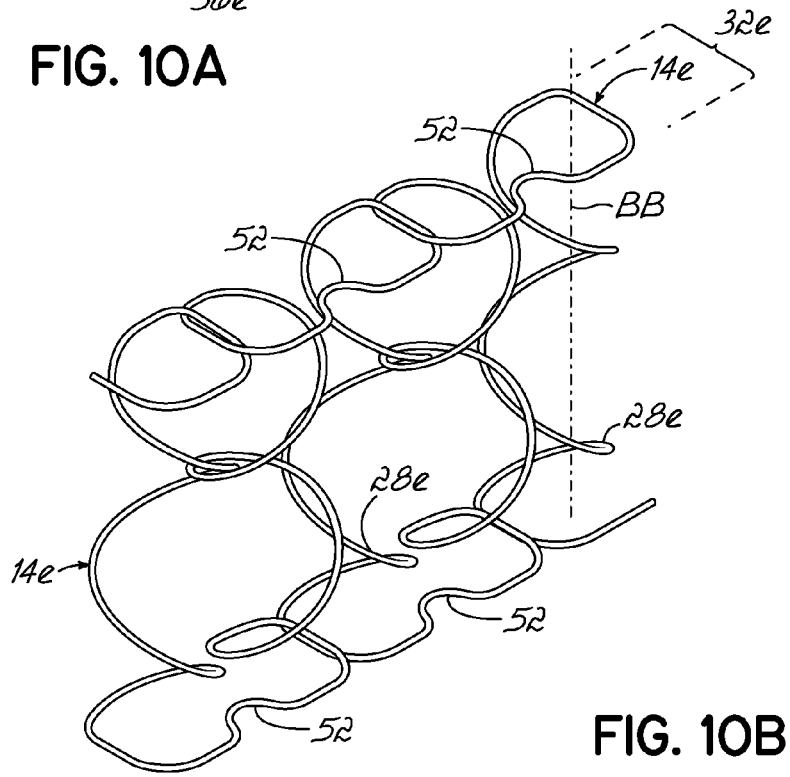
FIG. 10B is an enlarged perspective view of a continuous row of coil springs of the spring core of FIG. 10.

FIG. 10B illustrates a portion of one of the rows 32e of continuous springs 14e. As most clearly shown in FIG. 10B, the convolutions of central spiral portions 28e defining central spring axes BB may be interlocked or intertwined, as may be portions of adjacent connectors 52. The spring core of the present invention may alternatively be made of other continuous rows of springs, such as those disclosed in U.S. Pat. Nos. 4,790,038 and 4,886,249, which are both fully incorporated herein.

One of ordinary skill in the art will readily recognize that the alternative embodiments of the mattress 10 shown herein are exemplary only of a wide variety of alternative configurations that are readily possible within the scope of this invention.

From the above disclosure of the general principles of the present invention, and the preceding detailed description of at least one preferred embodiment, those skilled in the art will readily comprehend the various modifications to which this invention is susceptible. Therefore, we desire to be limited only by the scope of the following claims and equivalents thereof.

We claim:

1. A bedding or seating product comprising:
a spring assembly made up of upper and lower border wires and a plurality of rows of springs connected with each other by helical lacing wires, wherein each of the border wires has a generally rectangular cross-sectional configuration, each of the border wires having top and bottom surfaces defining a height of the border wire and side surfaces defining a width of the border wire, the height being greater than the width when the spring core is oriented such that the border wires are horizontal, each of the rows of springs being made of a single piece of wire, each of said springs having a central spiral portion defining a central spring axis, adjacent springs within a row being connected with each other by connectors and adjacent rows of springs being connected with each other by helical lacing wires, wherein the outermost connectors of each of the rows are positioned below the upper border wire and above the lower border wire, each of the outermost connectors being clipped to the nearest border wire with at least one clip, each of the clips having two sides parallel the side surfaces of the border wires and two curved ends of different radiuses;
padding overlaying the spring assembly;
a fabric covering encasing the padding and spring assembly.

2. A bedding or seating product comprising:
a spring assembly made up of upper and lower border wires and a plurality of rows of springs connected with each other by helical lacing wires, wherein each of the border wires has a generally rectangular cross-sectional configuration, each of the border wires having top and bottom surfaces defining a height of the border wire and side surfaces defining a width of the border wire, the height being greater than the width when the spring core is oriented such that the border wires are horizontal, each of the rows of springs being made of a single piece of wire, each of said springs having a central spiral portion defining a central spring axis, adjacent springs within a row being connected with each other by connectors and adjacent rows of springs being connected with each other by helical lacing wires, wherein the outermost connectors of each of said rows of springs are positioned below the upper border wire and above the lower border wire, each of the outermost connectors being clipped to the nearest border wire with at least one clip, each of the clips having two sides parallel the side surfaces of the border wires and two curved ends of different radiuses.

3. The product of claim 2 wherein each of the rows of the springs extends longitudinally.

4. The product of claim 2 wherein each of the border wires is made of seven-gauge wire.

5. The product of claim 2 wherein the cross-section of each of the border wires has rounded corners.

6. The product of claim 2 wherein each of the connectors is "E-shaped".

7. The product of claim 2 wherein each of the border wires is made of a smaller diameter wire than a border wire having a circular cross-section having approximately the same beam strength, thereby enabling the spring core to be made using less material.

8. The product of claim 7 wherein each of the connectors is "Z-shaped".

9. The product of claim 2 wherein each of the rows of the springs extends transversely.

10. A bedding or seating product comprising:
a spring core made up of upper and lower border wires and a plurality of rows of springs wherein each of the border wires has a generally rectangular cross-sectional configuration, each of the rows of springs being made of a single piece of wire and being connected with each other at the upper and lower end turns by helical lacing wires each of said springs having a central spiral portion defining a central spring axis, adjacent springs within a row being connected with each other by connectors and adjacent rows of springs being connected with each other by helical lacing wires, wherein the outermost connectors of each of said rows of springs are positioned below the upper border wire and above the lower border wire, each of the outermost connectors being clipped to the nearest border wire with at least one clip, each of the clips having two sides parallel side surfaces of the border wires and two curved ends of different radiuses.

11. The product of claim 10 wherein each of the border wires has a cross-section having a height and a width, the height being greater than then width.

12. The product of claim 10 wherein each of the border wires is made of seven-gauge wire.

13. The product of claim 10 wherein each of the connectors is "Z-shaped".

14. The product of claim 10 wherein each of the rows of the springs extends longitudinally.

15. The product of claim 10 wherein each of the rows of the springs extends transversely.

16. A bedding or seating product comprising:
a spring core comprising a plurality of rows of springs joined to each other by helical lacing wires, each of the rows of springs comprising a row of interconnected springs formed from one wire; and
upper and lower border wires wherein each of the border wires has a generally rectangular cross-sectional configuration including a height defined as the linear distance between top and bottom surfaces of the border wire and a width defined as the linear distance between opposed side surfaces of the border wire, the height being greater than the width when the spring core is oriented such that the border wires are horizontal, adjacent springs within a row being connected with each other by connectors wherein the outermost connectors of each of said rows of springs are positioned below the upper border wire and above the lower border wire, each of the outermost connectors being clipped to a nearest border wire with at least one clip, each of the clips having two sides parallel the side surfaces of the nearest border wire and two curved ends of different radiuses.

17. The product of claim 16 wherein each of the border wires is made of a smaller diameter wire than a border wire having a circular cross-section having approximately the same beam strength, thereby enabling the spring core to be made using less material.

18. The product of claim 16 wherein each of the border wires is made of seven-gauge wire.

19. The product of claim 16 wherein the cross-section of each of the border wires has rounded corners.

20. The product of claim 16 wherein each of the connectors is "Z-shaped".

* * * * *